United States Patent
Korn

(10) Patent No.: US 6,305,425 B1
(45) Date of Patent: Oct. 23, 2001

(54) PIPE LEADTHROUGH

(76) Inventor: Doris Korn, Wieterfeld 12, D-37154 Northeim (DE)

( * ) Notice: Subject to any disclaimer, the term of this patent is extended or adjusted under 35 U.S.C. 154(b) by 0 days.

(21) Appl. No.: 09/577,458

(22) Filed: May 24, 2000

(51) Int. Cl.[7] ................................................. F16L 55/00
(52) U.S. Cl. ......................... 138/110; 138/106; 138/108; 138/112
(58) Field of Search ..................................... 138/110, 114, 138/108, 106, 112; 52/302.1, 302.3, 220.8

(56) References Cited

U.S. PATENT DOCUMENTS

| | | | |
|---|---|---|---|
| 3,921,673 | * 11/1975 | Pero ....................................... | 138/110 |
| 4,704,840 | * 11/1987 | Gatto ....................................... | 52/741 |
| 5,697,194 | * 12/1997 | Gignac et al. .................... | 138/106 X |
| 5,950,381 | * 9/1999 | Stansbie ............................... | 52/220.8 |
| 6,085,795 | * 7/2000 | Ogawa et al. .................... | 138/110 X |
| 6,161,589 | * 12/2000 | Bolotte et al. ........................ | 138/106 |
| 6,161,590 | * 12/2000 | Wulff .................................... | 138/110 |

* cited by examiner

Primary Examiner—Patrick Brinson
(74) Attorney, Agent, or Firm—Herbert L. Lerner; Laurence A. Greenberg; Werner H. Stemer

(57) ABSTRACT

A pipe leadthrough which can be fitted in a simple and functionally reliable manner and which ensures complete sealing against penetrating moisture on a permanent basis is described. This is achieved by the fact that the pipe leadthrough is formed of a pipe sleeve that has a hollow-cylindrical portion and an adjoining plate-shaped portion. The hollow-cylindrical portion has an internal diameter which is identical to or slightly greater than the external diameter of a pipe and on the hollow-cylindrical portion there is at least one hollow body with a destructible covering, which body is filled with a sealant.

14 Claims, 3 Drawing Sheets

PIPE LEADTHROUGH

BACKGROUND OF THE INVENTION

Field of the Invention

The invention concerns a pipe leadthrough, in particular for supply and disposal lines of any diameter that are laid in the ground and pass through openings drilled in walls of houses.

In the case of the conventional type of pipe leadthrough through a drilled opening, for example through the masonry of a wall of a house, these openings are closed with mortar to seal them against moisture penetrating from outside. It being difficult for the mortar to be introduced over the entire length of the opening around a pipe led through the wall, so that, in just the same way as the different thermal expansions of the materials involved or the smooth surface of PVC pipes, this may have the result that gaps remain horizontally along a pipe or hairline cracks may occur, allowing moisture to get inside the house.

SUMMARY OF THE INVENTION

It is accordingly an object of the invention to provide a pipe leadthrough that overcomes the above-mentioned disadvantages of the prior art devices of this general type, which can be fitted in a simple and functionally reliable manner and which ensures complete sealing against penetrating moisture on a permanent basis.

With the foregoing and other objects in view there is provided, in accordance with the invention, a pipe leadthrough, including:

a pipe sleeve having a hollow-cylindrical portion and a plate-shaped portion adjoining the hollow-cylinder portion, the hollow-cylindrical portion having an internal diameter equal to or greater than an external diameter of a pipe;

at least one hollow body having a destructible covering disposed on the hollow-cylindrical portion; and a sealant filling the hollow body.

The fact that the pipe leadthrough contains the pipe sleeve having a hollow-cylindrical portion which extends into a drilled opening and an internal diameter which is identical to or slightly greater than the external diameter of the pipe led through the wall and the fact that there is attached to the hollow-cylindrical portion a plate-shaped portion on which there is disposed at least one hollow body with the destructible covering in which the sealant is located allow a permanently impermeable seal to be produced by pushing the pipe sleeve on from the outside against a cellar wall. This results in the hollow body being destroyed and the sealant is released and distributed uniformly in axial and radial gaps between the wall and the pipe sleeve by repeated turning of the pipe sleeve through 360°.

It is also advantageous that, in addition to the horizontal sealing plane, a vertical sealing plane is produced between the plate-shaped portion and the exterior wall. The plate-shaped portion is additionally pressed from the outside against the exterior wall when earth is filled in, so that on the one hand the seal is advantageously subjected to mechanical compressive loading and on the other hand a possible gap is reduced or completely closed by the axial pressure of the earth masses acting on the plate. Additional sealing with conventional materials, for example a bituminous or seal coating, achieves further increased reliability against the penetration of moisture.

What is especially advantageous about the inventive pipe leadthrough is the simple way in which it is handled. By simply pushing the pipe sleeve, provided with the hollow body filled with the sealant, onto a pipe protruding from a wall, the sealing is produced by destroying the hollow body containing the sealant, and turning the pipe sleeve and thereby distributing the sealant. The pipe leadthrough additionally proves to be particularly stable, since the forces acting in the installed state contribute in an advantageous way to the strengthening of the connection. The pipe sleeve may be formed from a refractory or fire-retardant material.

The inventive pipe leadthrough may also be configured in such a way that it is divided along an axial central longitudinal plane, so that it can also be retrofitted in the case of already existing pipe connections. The individual parts of the pipe leadthrough are then preferably configured in such a way that they can be connected to one another by clipping into one another. The dividing plane may have smooth or pronged abutting edges.

According to a particularly preferred embodiment of the invention, the hollow body is configured in the form of a tube and extends completely around the hollow-cylindrical portion, so that, when the hollow body is destroyed, it is ensured that the sealant goes over the entire circumference of the hollow-cylindrical portion and also partly into the region of the radial contact area between the plate-shaped portion and the exterior wall.

A further improved variant of the inventive subject matter has a two-component sealant, for example containing a basic composition and a hardener, in two separate hollow bodies, so that it is ensured that the sealant does not cure prematurely. Full distribution, and mixing if appropriate, of the sealant is ensured after pressing the pipe sleeve against the exterior wall by repeated turning through 360°. To ensure that the sealant does not come out just at one point of the hollow body, it is also possible for a plurality of hollow bodies to be disposed over the circumference of the hollow-cylindrical portion, so that distribution of the sealant over the full surface area can be ensured from the outset.

The sealant preferably contains a curing single-component or multi-component resin, so that a solid adhesive bond can be produced between the pipe sleeve and the inner wall of the drilled opening and the exterior wall. The individual components, for example a basic composition and a hardener, may be kept in different hollow bodies, so that they can react with one another in any desired form, and the resin cures, only after the hollow bodies have been destroyed.

In the case of a most particularly preferred embodiment of the invention, the hollow-cylindrical portion has additional apertures, through which the sealant can reach the surface of the pipe and also provide a seal there, so that altogether 100% impermeability of the pipe leadthrough is achieved.

To prevent the sealant from escaping into the free space between the pipe and the wall, the region at the end face of the hollow-cylindrical portion of the pipe sleeve is provided with a resilient lug which runs radially around it and can come to bear elastically against the inner surface of the wall opening. For additional mechanical fixing of the pipe sleeve in a wall, the lug has detents supported there.

For better handling of the pipe leadthrough, axially projecting lugs are formed onto the pipe sleeve, serve as handling aids and make it possible for the pipe sleeve to be turned unproblematically on the pipe in the direction of the exterior wall. Another advantageous embodiment has for this purpose tool-engaging locations made in the plate-shaped portion.

In the case of a further, highly refractory embodiment of the invention, a ring of concrete or some other fire-retardant material, such as foam glass for example, is fitted onto the pipe sleeve, which ring has ear pockets for the lugs of the pipe sleeve and outwardly protruding loops or recessed grips, with which the pipe sleeve together with the ring can be turned. The ring may also be of a divided configuration for retrofitting of the refractory embodiment. The lugs of the pipe sleeve may in this case serve at the same time for centering and for holding together the individual parts of the ring. After fitting, the remaining voids are filled with mortar, in particular fireclay mortar.

The hollow body filled with the sealant preferably consists of thin glass, which breaks all around when the pipe sleeve is subjected to compressive loading and releases the sealant simultaneously over the entire circumference. It is also conceivable to use a hollow body with a thin plastic skin, it having to be ensured however that the sealant cannot come out just at one point. This can be achieved by the configuration of a plurality of part-volumes disposed radially portion by portion, or by a configuration of additional lugs, which are directed obliquely radially outward from the front end of the pipe leadthrough and, when in the new state, grip radially around a hollow body and, during pushing into the opening, are pressed against the hollow-cylindrical portion of the pipe sleeve and destroy the plastic skin simultaneously at a number of points. Such lugs may preferably have further, radially outward-extending barbs, with which they additionally lock a pipe leadthrough in an opening with frictional and form-fitting engagement.

Also advantageous is an embodiment of the invention with a surface area of the plate-shaped portion which is provided with prongs or points toward the wall and moreover is configured in such a way that it becomes conically narrower inwardly, whereby radial pressing out of sealant can be counteracted and the prongs or points maintain a free space for the resin, so that a minimum layer thickness is always ensured.

Other features which are considered as characteristic for the invention are set forth in the appended claims.

Although the invention is illustrated and described herein as embodied in a pipe leadthrough, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
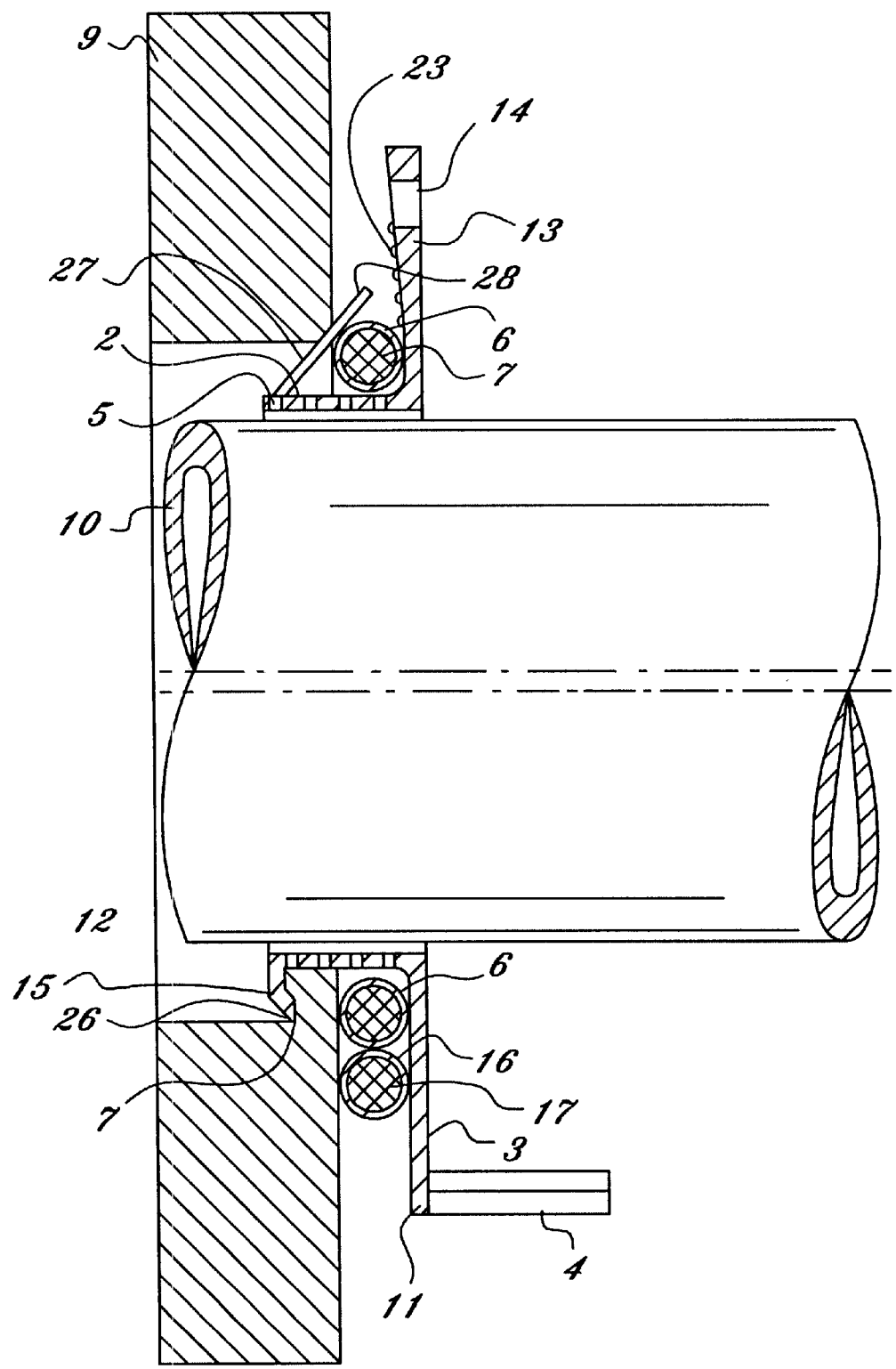
FIG. 1 is a partial, sectional view through upper and lower parts of a pipe leadthrough passing through an exterior wall according to the invention.

In all the figures of the drawing, sub-features and integral parts that correspond to one another bear the same reference symbol in each case. Referring now to the figures of the drawing in detail and first, particularly, to FIG. 1 thereof, there is shown a pipe leadthrough formed of a pipe sleeve 1;11. The pipe sleeve 1;11 has a hollow-cylindrical portion 2;12 and a plate-shaped portion 3;13, the latter adjoining the hollow-cylindrical portion 2;12. Either a single tubular hollow body 6, which is filled with a curing sealant 7, is fitted onto the hollow-cylindrical portion 2;12 or two separate hollow bodies 6;16 are used, with different components of sealant 7;17, for example with a basic composition and a hardener, so that, by pressing in and at the same time turning the pipe sleeve 1;11 and destroying the hollow body 6;16, the sealant 7;17 escapes and is distributed in a horizontal opening 8, in a gap between a wall 9 of a house and the plate-shaped portion 3;13 as well as through apertures 5 in the hollow-cylindrical portion 2;12 as far as a pipe 10, and if appropriate is completely mixed and, curing there, forms a durable, stable and waterproof pipe leadthrough.

Disposed on the plate-shaped portion 3 are axially protruding lugs 4, which serve as handling aids for the fitting of the pipe leadthrough. The lugs 4 may also be replaced by tool-engaging locations 14, which are made in the plate-shaped portion 13 as recesses.

The escape of the sealant 7;17 into a free space between the pipe 10 and the wall 9 is prevented by providing a region at an end face of the hollow-cylindrical portion 12 of the pipe sleeve with a resilient lug 15 which runs radially around it, can come to bear elastically against an inner surface of the wall opening and, for additional mechanical fixing of the pipe sleeve 1 in the wall 9, has detents 26 supported there.

To ensure that the sealant 7;17 does not come out of the hollow body 6;16 just at one point there are additional lugs 27, which are directed obliquely radially outward from the front end of the hollow-cylindrical portion 2;12 of the pipe leadthrough and, when in the new state, grip radially around or form a tangent to the hollow body 6 and, during pushing of the pipe sleeve 1 into the opening, are pressed against the hollow-cylindrical portion 2;12 and destroy a plastic skin of the hollow body 6 simultaneously at a number of points. The lugs 27 have further, radially outward-extending barbs 28, with which they additionally lock the pipe leadthrough in an opening with frictional and form-fitting engagement.

Figure 2:
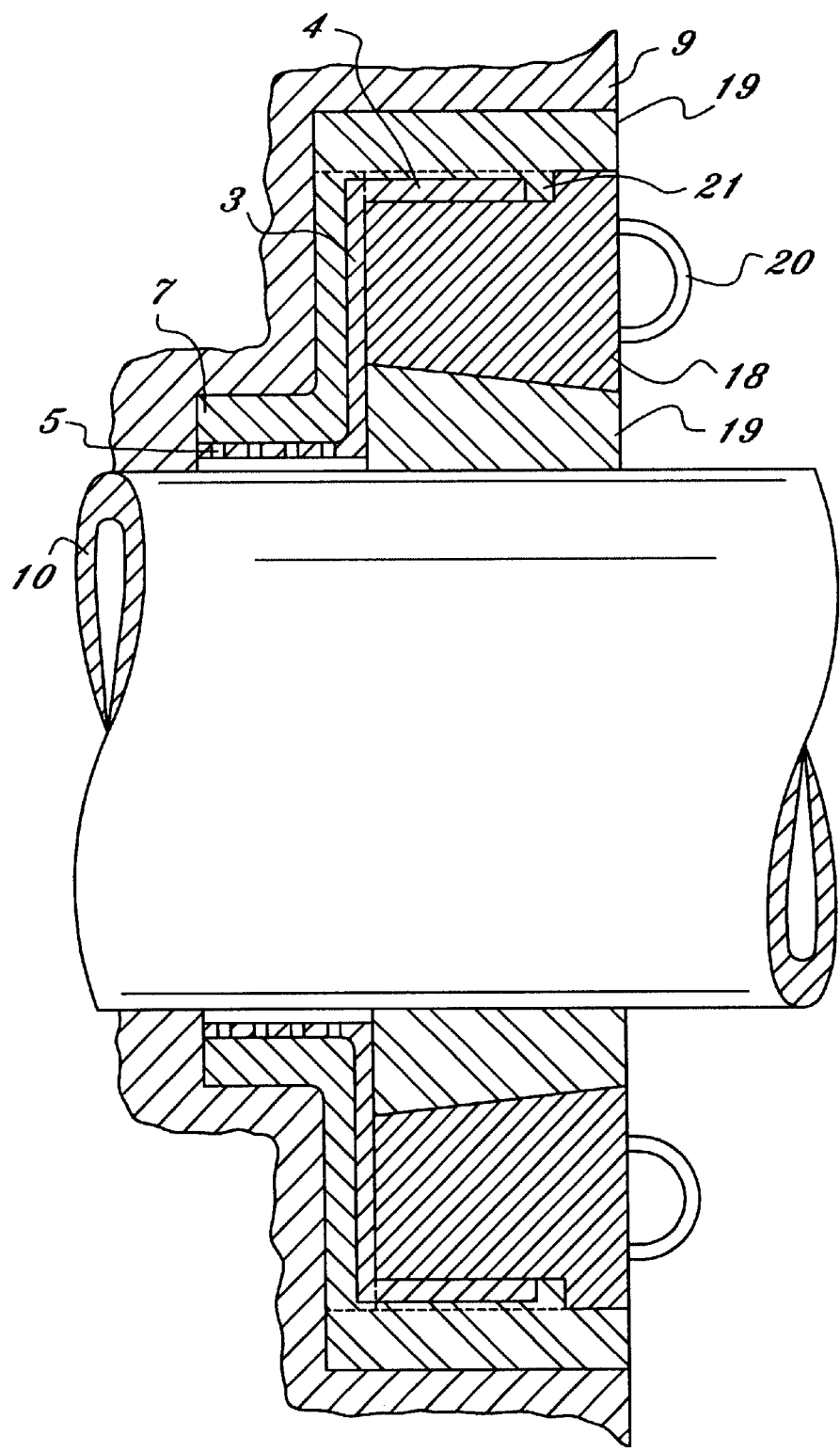
FIG. 2 is a partial, sectional view of a highly refractory pipe leadthrough.

In the case of a highly refractory embodiment of the pipe leadthrough, there are, as represented in FIG. 2, loops 20 cast into a ring 18, which has ear pockets 21 for the lugs 4 of the pipe sleeve 1, so that turning of the ring 18 and of the pipe sleeve 1 can take place by use of the loops 20. The lugs 4 at the same time ensuring that the ring 18 is centered. The ring 18 is fixed in the wall 9 after fitting by fireclay mortar 19.

Figure 3:
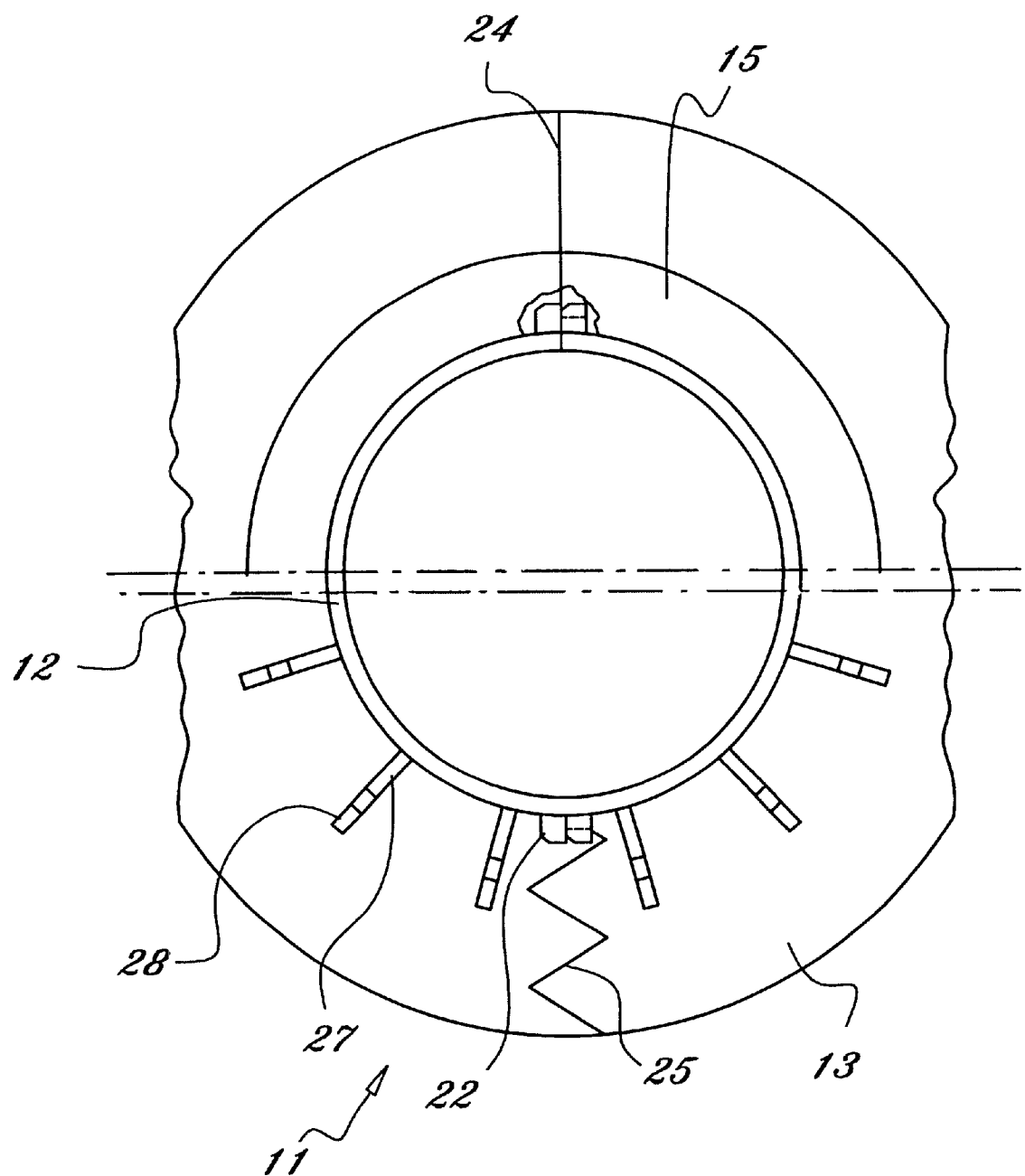
FIG. 3 is a partial, section view of a pipe leadthrough with an axial dividing plane.

Just like the pipe sleeve 1;11 represented in FIG. 3, the ring 18 may have an axial dividing plane, which makes it possible for the pipe leadthrough also to be retrofitted. For this purpose, catches 22 engaging in one another are disposed on the hollow-cylindrical portion 2;12. The halves of the pipe sleeve 1 may in this case have smooth abutting edges 24 or pronged abutting edges 25.

The plate-shaped portion 13 of the embodiment shown in the top of FIG. 1 has on its side directed toward the wall 9 a cross section which becomes conically narrower inwardly from the outside and has projecting prongs or points 23, the latter serving on the one hand together with the conicity for ensuring that the sealant 7;17 cannot be pressed radially out of the gap between the wall 9 and the plate-shaped portion 13 and on the other hand for ensuring that a defined layer thickness is maintained. The points 23 running around radially also produce a kind of labyrinth-slot seal for the eventuality that the adhesive effect of the sealant should happen to fail.

I claim:

1. A pipe leadthrough, comprising:
a pipe sleeve having a hollow-cylindrical portion and a plate-shaped portion adjoining said hollow-cylinder portion, said hollow-cylindrical portion having an internal diameter equal to or greater than an external diameter of a pipe;
at least one hollow body having a destructible covering disposed on said hollow-cylindrical portion; and
a sealant filling said hollow body.

2. The pipe leadthrough according to claim 1, wherein said hollow body is a tube disposed over a circumference of said hollow-cylindrical portion.

3. The pipe leadthrough according to claim 1, wherein said sealant is selected from the group consisting of a curing single-component resin and a multi-component resin.

4. The pipe leadthrough according to claim 3, wherein said hollow-cylindrical portion has radial apertures formed therein.

5. The pipe leadthrough according to claim 1, wherein said hollow-cylindrical portion has a front region and including a resilient lug running radially around said front region.

6. The pipe leadthrough according to claim 1, including axially projecting lugs formed onto said plate-shaped portion.

7. The pipe leadthrough according to claim 1, wherein said hollow body is formed of a material selected from the group consisting of thin glass and a thin plastic skin.

8. The pipe leadthrough according to claim 1, wherein said pipe sleeve is axially dividable and has catches engaging in one another.

9. The pipe leadthrough according to claim 6, including a ring with cast-in loops and ear pockets for receiving said lugs and, in an installed state, the pipe leadthrough is fixed in a wall with mortar, and said pipe sleeve formed of a refractory material.

10. The pipe leadthrough according to claim 9, wherein said ring is formed of a material selected from the group consisting of concrete, a non-combustible material, and foam glass.

11. The pipe leadthrough according to claim 1, wherein said plate-shaped portion has tool-engaging locations formed therein and functioning as handling aids.

12. The pipe leadthrough according to claim 6, including a ring with recessed grips formed therein and ear pockets for receiving said lugs and, in an installed state, the pipe leadthrough is fixed in a wall with mortar, and said pipe sleeve formed of a refractory material.

13. The pipe leadthrough according to claim 12, wherein said ring is formed of a material selected from the group consisting of concrete, a non-combustible material, and foam glass.

14. A pipe leadthrough for supply and disposal lines of any diameter being laid in ground and passing through openings drilled in walls of houses, comprising:
a pipe sleeve having a hollow-cylindrical portion and a plate-shaped portion adjoining said hollow-cylinder portion, said hollow-cylindrical portion having an internal diameter equal to or greater than an external diameter of a pipe;
at least one hollow body having a destructible covering disposed on said hollow-cylindrical portion; and
a sealant filling said hollow body.

* * * * *

UNITED STATES PATENT AND TRADEMARK OFFICE
CERTIFICATE OF CORRECTION

PATENT NO.    : 6,305,425 B1
DATED         : October 23, 2001
INVENTOR(S)   : Doris Korn It is certified that error appears in the above-identified patent and that said Letters Patent is hereby corrected as shown below:

<u>Title page,</u>
Item [30], Foreign Application Priority Data, should read as follows:
-- Aug. 2, 1999      [DE]      ............ 299 13 215
   Mar. 20, 2000     [DE]      ............ 200 05 066 --

Signed and Sealed this

Eighteenth Day of May, 2004

JON W. DUDAS
*Acting Director of the United States Patent and Trademark Office*